US012111454B2

(12) United States Patent
Giske et al.

(10) Patent No.: US 12,111,454 B2
(45) Date of Patent: Oct. 8, 2024

(54) LASER SCANNING MICROSCOPE AND METHOD FOR DETERMINING A POSITION OF A FLUOROPHORE

(71) Applicant: Leica Microsystems CMS GmbH, Wetzlar (DE)

(72) Inventors: Arnold Giske, Sandhausen (DE); Jonas Foelling, Freiburg (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 253 days.

(21) Appl. No.: 17/779,592

(22) PCT Filed: Nov. 18, 2020

(86) PCT No.: PCT/EP2020/082465
§ 371 (c)(1),
(2) Date: May 25, 2022

(87) PCT Pub. No.: WO2021/104955
PCT Pub. Date: Jun. 3, 2021

(65) Prior Publication Data
US 2023/0008453 A1    Jan. 12, 2023

(30) Foreign Application Priority Data
Nov. 29, 2019  (EP) .................................... 19212710
Dec. 12, 2019  (EP) .................................... 19215601

(51) Int. Cl.
*G02B 21/00* (2006.01)
*G01N 21/64* (2006.01)

(52) U.S. Cl.
CPC ..... *G02B 21/0076* (2013.01); *G01N 21/6458* (2013.01); *G02B 21/0032* (2013.01); *G02B 21/0048* (2013.01); *G02B 21/0072* (2013.01)

(58) Field of Classification Search
CPC ............ G02B 21/0076; G02B 21/0032; G02B 21/0048; G02B 21/0072; G02B 26/0833; G02B 26/0875; G01N 21/6458
See application file for complete search history.

(56) References Cited

U.S. PATENT DOCUMENTS

| 5,035,476 A | * | 7/1991 | Ellis | .................. | G02B 21/0032 |
| | | | | | 359/368 |
| 8,788,021 B1 | * | 7/2014 | Flusberg | .............. | A61B 5/0062 |
| | | | | | 385/117 |
| 2017/0336326 A1 | | 11/2017 | Sirat et al. | | |

OTHER PUBLICATIONS

Balzarotti et al. "Nanometer resolution imaging and tracking of fluorescent molecules with minimal photon fluxes," arXiv:1611. 03401, Arxiv, US, pp. 1-85, Nov. 10, 2016.

(Continued)

*Primary Examiner* — Kiho Kim
(74) *Attorney, Agent, or Firm* — LEYDIG, VOIT & MAYER, LTD.

(57) ABSTRACT

A laser scanning microscope includes a light source configured to emit an illumination light beam. The illumination light beam has a transverse light intensity profile comprising an intensity minimum. The laser scanning microscope further includes a scanning device configured to scan the illumination light beam along a closed trajectory in a target area of a specimen, and a detector configured to detect fluorescence light emitted by a fluorophore within the target area of the specimen. The fluorophore is excited by the illumination light beam. The laser scanning microscope further includes a processor configured to determine an intensity distribution of the fluorescence light as a function of time and to determine a position of the fluorophore within the target area based on the intensity distribution of the fluorescence light.

15 Claims, 10 Drawing Sheets

(56) References Cited

OTHER PUBLICATIONS

Katarina Kis-Petikova and Enrico Gratton: "Distance measurement by circular scanning of the excitation beam in the two-photon microscope", Microscopy Research and Technique., vol. 63, No. 1, Oct. 1, 2003, pp. 34-49, XP055709837, Wiley InterScience, US.
Yvan Eilers et al: "MINFLUX monitors rapid molecular jumps with superior spatiotemporal resolution", Proceedings of the National Academy of Sciences, vol. 115, No. 24, May 29, 2018 (May 29, 2018), pp. 6117-6122, XP055678964, US.
Fabian Wehnekamp, "3D Orbital Tracking Microscopy: From Cells To Organisms", Nov. 2, 2016, XP055710242, Ludwig-Maximilians-Universität, Munich, Germany, pp. 1-210.

* cited by examiner ent by reading the following detailed description with reference to the attached drawings, which illustrate the following:

LASER SCANNING MICROSCOPE AND METHOD FOR DETERMINING A POSITION OF A FLUOROPHORE

CROSS REFERENCE TO RELATED APPLICATIONS

This application is a U.S. National Phase application under 35 U.S.C. § 371 of International Application No. PCT/EP2020/082465, filed on Nov. 18, 2020, and claims benefit to European Patent Applications No. EP 19212710.8, filed on Nov. 29, 2019, and No. EP 19215601.6, filed on Dec. 12, 2019. The International Application was published in English on Jun. 3, 2021 as WO 2021/104955 A1 under PCT Article 21(2).

FIELD

Embodiments of the present invention relate to a laser scanning microscope. Embodiments of the present invention further relate to a method for determining a position of a fluorophore within a target area of a specimen.

BACKGROUND

From the prior art a number of laser scanning microscopes are known that allow imaging of structures smaller than the Abbe limit of around 200 nm. The so called super resolution microscopes operate by exciting fluorophores within a small target area of a specimen and inferring their position from the emitted fluorescence light.

The preprint document *Nanometer resolution imaging and tracking of fluorescent molecules with minimal photon fluxes* by Balzarotti et al. (found under arXiv:1611.03401) discloses a laser scanning microscope with nanometer resolution. The laser scanning microscope comprises a laser light source configured to form an illumination light beam with a donut-shaped transverse intensity profile. This illumination light beam is directed by a beam deflector onto three points within a target area of a specimen in order to excite a fluorophore located within said target area. From the fluorescence light emitted by the fluorophore the position of the fluorophore within the target is inferred. However, this laser scanning microscope requires expensive conical diffractors in order to achieve super resolution. Further, the laser scanning microscope according to this document has a low detection duty cycle due to time required to reposition the illumination light beam in conical diffraction.

The document US 2017/0336326 A1 discloses another laser scanning microscope with nanometer resolution based on conical diffraction. The disadvantages thereof are essentially the same as mentioned above.

SUMMARY

Embodiments of the present invention provide a laser scanning microscope that includes a light source configured to form an illumination light beam. The illumination light beam has a transverse light intensity profile comprising an intensity minimum. The laser scanning microscope further includes a scanning device configured to scan the illumination light beam along a closed trajectory in a target area of a specimen, and a detector configured to detect fluorescence light emitted by a fluorophore within the target area of the specimen. The fluorophore is excited by the illumination light beam. The laser scanning microscope further includes a processor configured to determine an intensity distribution of the fluorescence light as a function of time and to determine a position of the fluorophore within the target area based on the intensity distribution of the fluorescence light.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 8*b* is a top view of the first scanning element according to FIG. 8*a* in;

DETAILED DESCRIPTION

Figure 1:
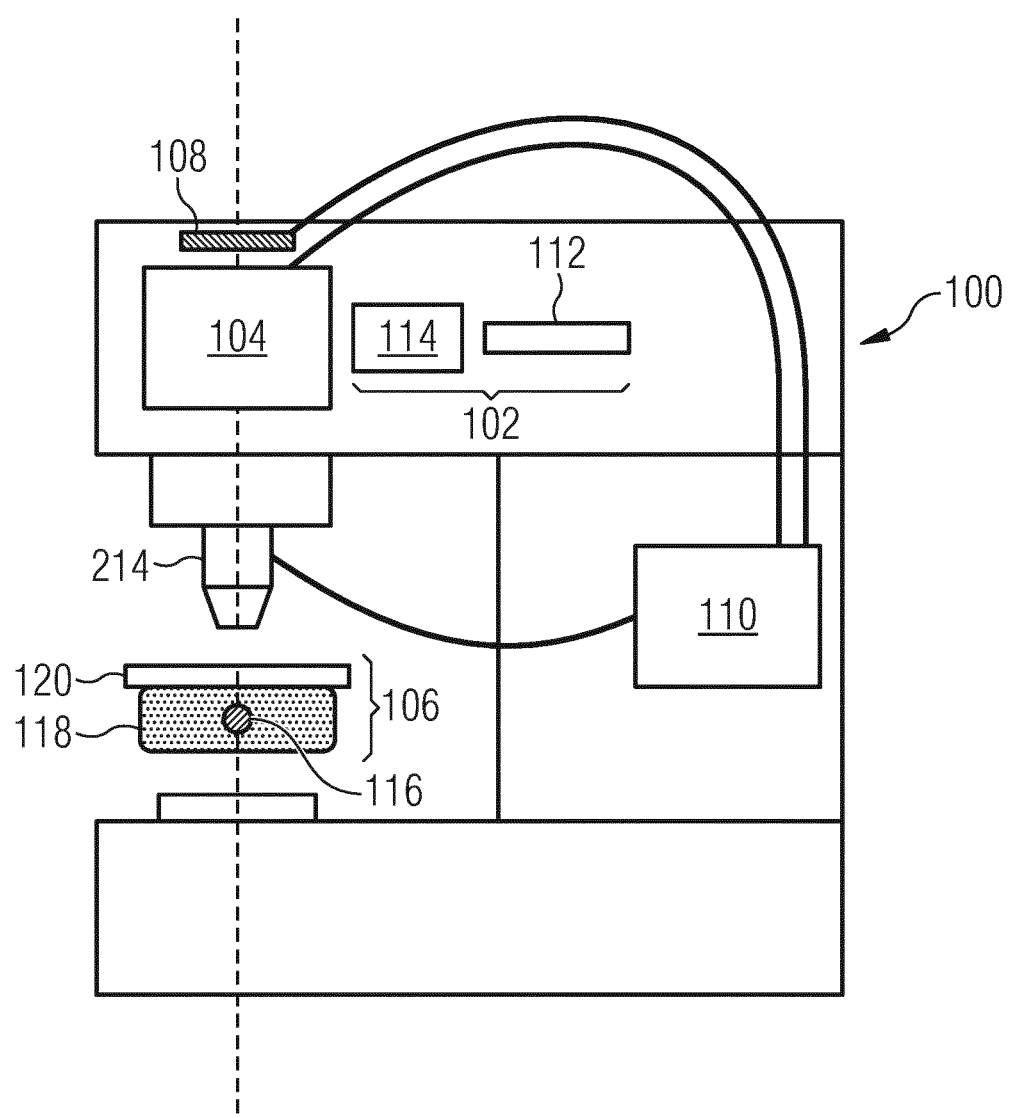
FIG. 1 is a schematic diagram of a laser scanning microscope according to an embodiment.

Embodiments of the present invention provide a laser scanning microscope, that allows for fast super resolution imaging based on a relatively simple configuration.

A laser scanning microscope comprises a light source configured to form an illumination light beam, said illumination light beam having a transverse light intensity profile comprising an intensity minimum, a scanning element configured to scan a target area of a specimen with the illumination light beam along a closed trajectory, and a detector element configured to detect fluorescence light emitted by a fluorophore within the target area of the specimen, said fluorophore being excited by the illumination light beam. The laser scanning microscope further comprises a processor configured to determine an intensity distribution of the fluorescence light as a function of time and to determine a position of the fluorophore within the target area based on the intensity distribution of the fluorescence light.

In the present disclosure, transverse light intensity profile of the illumination light beam means the light intensity profile in a direction perpendicular to the propagation direction of the illumination light beam, in particular to the central axis of the propagation direction of the illumination light beam. The intensity minimum of said transverse light intensity profile is a proper minimum, i.e. a minimum that is located at a finite distance from the center of the illumination light beam. Preferably, the intensity minimum is located at the center of the illumination light beam, e.g. the illumination light beam is a donut- or torus-shaped beam.

The laser scanning microscope scans the target area with the illumination light beam along a closed trajectory. In other words, the illumination light beam moves across the target area in a periodic motion such that points within the target area are repeatedly scanned by the illumination light beam. In doing so, the illumination light beam excites fluorophores located within the target area. The excited fluorophores then emit fluorescence light. The intensity of the emitted fluorescence light at any given time depends on the intensity of the illumination light beam at the location of the fluorophore at said given time. This is in particular true, if only one single or only a few fluorophores, e.g. one single fluorescence molecule, are located in or near the target area. The position or localization of such a fluorophore is preferable static and does not change relative to the target area or to the other parts of the specimen at least within the time needed for the determination of the position of the molecule. Due to the motion of the illumination light beam and its non-uniform transverse light intensity profile, the intensity of the illumination light beam at the location of the fluorophore varies with time. Since the motion of the illumination light beam across the target area is periodic, the intensity of the illumination light beam at the location of the fluorophore also varies in a periodic manner. Thus, the intensity distribution of the fluorescence light emitted by the fluorophore is a periodic function of time that is dependent on the position of the fluorophore relative to the closed trajectory the illumination light beam is moved along. It is therefore possible to determine the position of the fluorophore within the target area based on the intensity distribution of the fluorescence light emitted by the fluorophore. This means, that the localization precision and/or the resolution of the laser scanning microscope is essentially not limited by the spatial resolution of an optical system of the laser scanning microscope. Thus, the laser scanning microscope allows super resolution imaging of structures smaller than the Abbe limit. The scanning of the target area can be done very fast since no repositioning of the illumination light beam to another target area is necessary. Further, the laser scanning microscope is simple in that it shares many components with conventional laser scanning microscopes, but could e.g. also be based on a single conventional fluorescence widefield microscope. Such a conventional fluorescence widefield should in particular have an additional illumination beam path with the light source configured to provide the transverse light intensity profile comprising the intensity minimum and/or the detector element configured to detect fluorescence light emitted by a fluorophore within the target area of the specimen.

In a preferred embodiment, the processor is configured to fit a periodic function to the intensity distribution of the fluorescence light and to determine the position of the fluorophore within the target area from at least one parameter of the fitted periodic function. In particular, the periodic function is a sine function or a linear combination of sine functions. The intensity distribution exhibits the same periodicity as the motion of the illumination light beam on the closed trajectory. Thus, the position of the fluorophore within the target area can be determined by comparing the at least one parameter of the fitted periodic function to an equivalent parameter of a function describing the periodic motion of the illumination light beam. The at least one parameter may be for example an amplitude or a phase of the fitted periodic function. The general shape of the periodic function may in particular be obtained by simulation. For example, the general shape of the periodic function may be determined from a computed (e.g. numerical or analytical) intensity distribution for a number of different positions of the fluorophore within the target area. The model function determined in this manner may then be fitted to the measured intensity distribution. Alternatively, a computed intensity distribution that fits the measured intensity distribution best may be selected, e.g. by computing a figure of merit, from a number of previously computed intensity distributions.

Preferably, the processor is configured to determine an amplitude spectrum, a phase spectrum and/or a frequency spectrum from the intensity distribution of the fluorescence light, to determine a number of fluorophores within the target area from the amplitude spectrum, the phase spectrum and/or the frequency spectrum, and to determine the position of each of these fluorophores based on the amplitude spectrum, the phase spectrum and/or the frequency spectrum. This embodiment allows for the reliable determination of the position of more than one fluorophore within the target area. In particular, the processor may be configured to determine a Fourier transform of the intensity distribution in order to obtain the aforementioned spectra. This allows for separating the overlapping contributions of the fluorescence light emitted by different fluorophores that form the intensity distribution. The individual contributions may then be processed separately in order to determine the position of each fluorophore within the target area.

In another preferred embodiment, the scanning element is configured such that a time required for the illumination light beam to run along the closed trajectory once is smaller than an average burst time of the fluorophore. In other words, a pixel dwell time of the laser scanning microscope is shorter than the average burst time of the fluorophore. Preferably, the illumination light beam runs along the closed trajectory three to five times within the average burst time of the fluorophore. This allows for enough fluorescence light to be detected before the fluorophore bleaches out or decays into a dark state in most cases. Thus, the position of the fluorophore within the target area can be determined even more precisely.

Preferably, the closed trajectory comprises an elliptical, a circular or a spiral trajectory. The spiral trajectory can be made into the closed trajectory by connecting the innermost point of the spiral trajectory with the outermost part of the spiral trajectory with a straight line, for example. Elliptical or circular trajectories are easy to implement and allow for fast and simple determination of the position of the fluorophore within the target area. The spiral trajectory can be used to scan a large area of the target area for fluorophores and subsequently to increase the resolution as the radius of the spiral trajectory decreases.

In another preferred embodiment, the closed trajectory is scanned relative to a predetermined position being the target area and/or wherein a periodic recurring position of the closed trajectory is at the same position of the target area or deviates from the same position of the target area maximal by a beam diameter of the illumination light beam.

Preferably, a diameter of the closed trajectory is smaller than or equal to a beam diameter of the illumination light beam. This ensures that all points along the closed trajectory are illuminated by the illumination light beam while the illumination light beam scans along closed trajectory. Thus, the fluorophores within the target area are constantly excited in accordance with the transverse light intensity profile of the illumination light beam as long as the illumination light beam scans the target area. This means that the fluorophores within the target area are constantly emitting fluorescence light. This can help to improve the fit of the periodic function to the detected intensity distribution of the fluorescence light and thus improve the determination of the position of the fluorophores within the target area.

In another preferred embodiment, the light source comprises a phase mask for creating an optical vortex along a propagation direction of the illumination light beam. This ensures that the transverse light intensity profile contains a region or point of zero intensity. Preferably, this point of zero intensity is located at the center of the illumination light beam. In this case the intensity profile of the illumination light beam is called a donut- or torus-shaped profile. Such a donut-shaped profile allows for an easy analysis of the measured intensity distribution. In an alternative embodiment, the phase mask may be part of the scanning element, e.g. applied to a mirror or a lens of the scanning element.

In another preferred embodiment, the laser scanning microscope comprises a main beam splitter configured to separate the illumination light beam and the fluorescence light emitted by the fluorophore. In this preferred embodiment a single objective may be used in order to direct the illumination light beam onto the specimen and to receive the fluorescence light emitted by the fluorophore. Thus, the laser scanning microscope according to this preferred embodiment can therefore be designed to be particularly compact.

In another preferred embodiment, the laser scanning microscope comprises another scanning element which is adjustable for directing the illumination light beam onto the target area. This another scanning element can be used to select a target area from a number of target areas which might have been identified/selected by a user of the laser scanning microscope in an overview image of the specimen which has been acquired beforehand in a conventional laser scanning mode applying the another scanning element or even in a conventional widefield microscope mode. Thus, this another scanning element provides means for course adjustment of the illumination light beam enabling the laser scanning microscope to consecutively scan different target areas of the specimen.

In another preferred embodiment, at least one of the another scanning element and the scanning element are operated either time sequentially or at the same time. In particular, the another scanning element might be used to move the illumination light beam slowly along a scanning path, e.g. in a meander shape, while the scanning element scans the target area along the closed trajectory in a comparable fast manner/at a high frequency. In this embodiment the target area itself is slowly moving across the specimen along the scanning path.

In another preferred embodiment, the scanning element comprises at least one of the following: a wobbling device, a MEMS device, preferably a resonant MEMS mirror or a piezo driven MEMS, an AOD, an AOM, a movable lens, and a piezo tube device. The MEMS device is a microelectromechanical device. Such a device may include a mirror or any other light deflecting element for directing the illumination beam. The AOD is an acousto-optic deflector. The AOM is an acousto-optic modulator, also called a Bragg cell.

The movable lens may be mounted on a rotating element and located off-center with regard to its rotation axis and the optical axis of the optical system of the laser scanning microscope. By directing the illumination light beam through the off-centered, rotating lens, the illumination light beam will attain a rotating angle, i.e. the illumination light beam does not propagate on a straight path along the optical axis. This movement can easily be transformed into a focus or the light intensity profile which performs a circular movement in an image plane of the optical system.

The movable lens may also be actuated by a magnetic or electric field to perform a rotary movement. This rotary movement may be resonant. In order to actuate the lens, it can be placed into a lens mount which is equipped with coils or capacitor plates in order to produce a magnetic or electric field, respectively. The lens mount may be attached by a flexible mounting, allowing a movement in the plane perpendicular to the optical axis of the optical system. Opposite to the coils or capacitor plates of the lens mount, fixed coils or capacitor plates are arranged, respectively. By applying currents through the coils or by charging and discharging the capacitor plates a force generated by the electro-magnetic field will move the lens holder in a direction perpendicular to the optical axis. By applying time-dependent, synchronized currents or charges, the lens holder with the lens will perform a circular movement. The illumination light beam entering the lens will be deflected by the off-centered lens as described above.

The piezo tube device comprises a stack of shearing piezo elements that are configured to produce to a rotating movement of one end of the stack. A reflective surface is applied to this end. The phase mask may also be applied to this surface. The illumination light beam will be reflected according the angle of the bent stack and scanned along the closed trajectory. Alternatively, the piezo stack can be hollow and incorporate an optical fiber emitting the illumination light beam. The rotating fiber tip can be imaged to the image plane of the optical system where it produces a circularly moving light distribution comprising the transverse light intensity profile.

Preferably, the scanning element is arranged in a pupil plane of the laser scanning microscope or in a plane that is optically equivalent to the pupil plane of the laser scanning microscope. In this embodiment, the movement of the illumination light beam created by the scanning element can easily be transformed into a movement in the image plane of the optical system without the need for correcting optical elements. This is in particular true if the optical system is telecentric.

It is advantageous if the light source comprises two or more laser light sources, which emit laser light at different wavelength or wavelength ranges. It is further advantageous if the light source comprises a beam merging element configured to merge the laser light emitted by laser light sources into a single beam. In this embodiment, it is possible to excite different kinds of fluorophores at the same time. This allows for imaging different structures within the specimen and increases the flexibility of the laser scanning microscope. Alternatively, a white light laser or a super continuing laser light source might be used as a single light source. Preferably there is a wavelength selection means being configured to select at least one wavelength of the light emitted by this white light laser or super continuing laser light source and configured to direct light of the selected wavelength to the specimen and/or to the target area.

Preferably, the microscope is a confocal microscope.

Embodiments of the present invention further relate to a method for determining a position of a fluorophore within a target area of a specimen. The method comprises the steps of forming an illumination light beam, said illumination light beam having a transverse light intensity profile comprising an intensity minimum, scanning the target area of the specimen with the illumination light beam along a closed trajectory, exciting a fluorophore within the target area with the illumination light beam, detecting fluorescence light emitted by the fluorophore, determining an intensity distribution of the fluorescence light as a function of time, and determining a position of the fluorophore within the target area based on the determined intensity distribution of the fluorescence light.

The method has the same advantages as the laser scanning microscope claimed and can be supplemented using the features of the dependent claims directed at the microscope.

FIG. 1 shows a schematic diagram of a laser scanning microscope 100 according to an embodiment. The laser scanning microscope 100 comprises a light source 102 configured to form an illumination light beam, an optical system 104 for directing the illumination light beam onto a target area 300 (see FIG. 3) of a specimen 106 and for imaging the specimen 106, a detector element 108, and a processor 110 for controlling the elements of the laser scanning microscope 100 and for processing the image of the specimen 106.

In the embodiment shown in FIG. 1, the light source 102 comprises a laser light source 112 and a phase mask 114. The laser light source 102 is configured to create a coherent illumination light. The phase mask 114 is configured to form the illumination light beam from the illumination light in such a way that the illumination light beam has a transverse light intensity profile comprising e.g. an optical vortex, i.e. a region of zero intensity, along the propagation direction of the illumination light beam. Thus, the illumination light beam has a transverse intensity profile that is donut- or torus-shaped with a point of zero intensity at its center.

The specimen 106 shown in FIG. 1 comprises an object 116 to be imaged, an optical medium 118 in which the object 116 is immersed, and a coverslip 120. The object 116 is prepared with fluorophores 308, 310 (see FIG. 3) that can be excited by the illumination light beam to emit fluorescence light. In order to image the object 116, the illumination light beam is directed by the optical system 104 via an objective 214 (see FIG. 2) onto the target area 300 of the specimen 106 which is located inside the object 116. The optical system 104 further directs the fluorescence light emitted by the fluorophores 308, 310 onto the detector element 108 of the laser scanning microscope 100. This will be described in more detail in the following with reference to FIG. 2.

Figure 2:
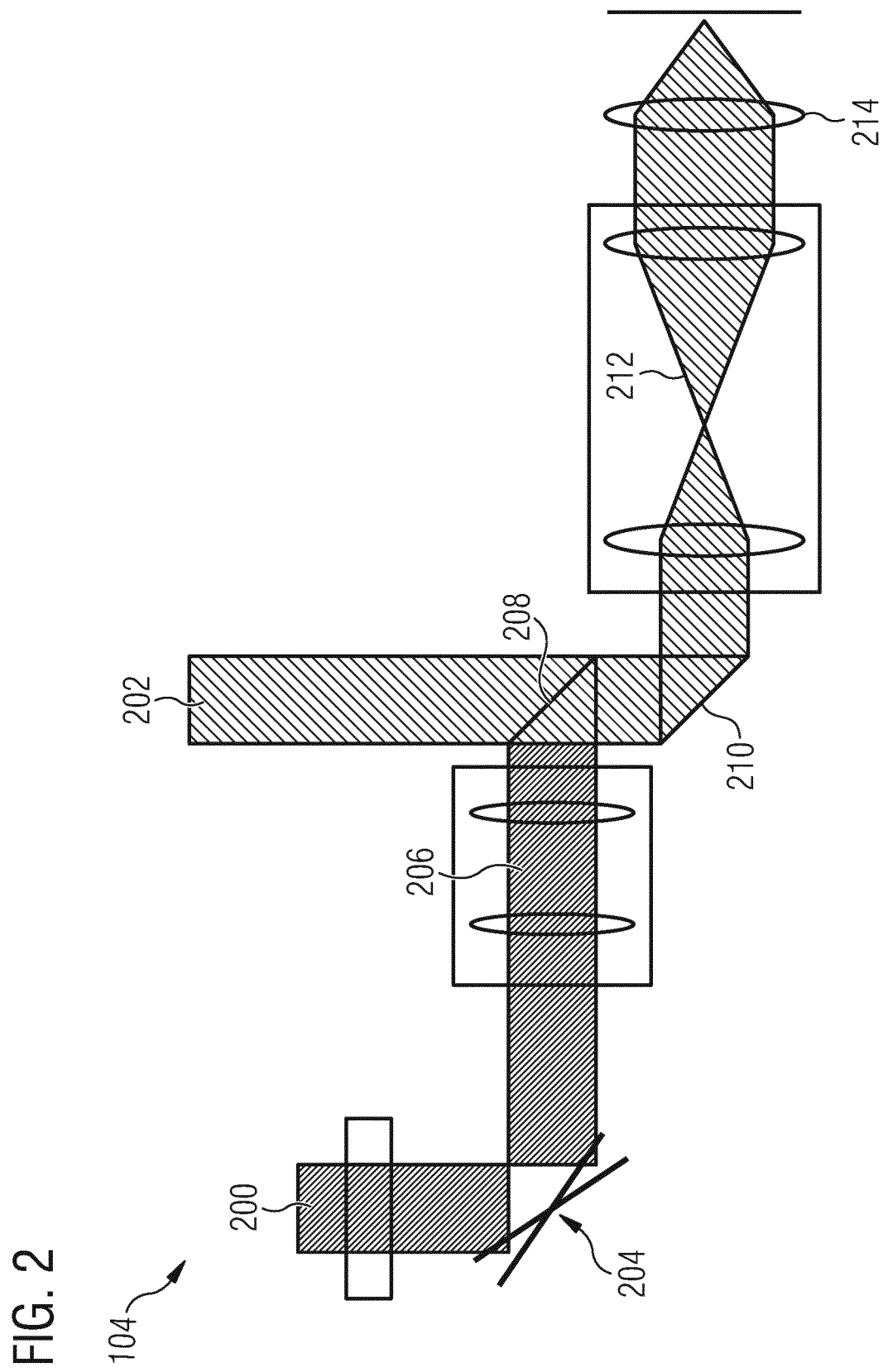
FIG. 2 is a schematic diagram of an optical system of the laser scanning microscope according to FIG. 1.

FIG. 2 shows a schematic diagram of the optical system 104 of the laser scanning microscope 100 according to FIG. 1. The optical system 104 comprises a first light path 200 and a second light path 202.

The first light path 200 is a path of the illumination light beam starting at the light source 102 (not shown in FIG. 2) and ending at the target area 300 of the specimen 106. The first light path 200 includes a first scanning element 204, a first relay optic 206, a dichroic beam splitter 208, another (second) scanning element 210, a second relay optic 212, and an objective lens 214. The second light path 202 is a path of the fluorescence light emitted by the fluorophores 308, 310 within the target area 300 starting at the target area 300 of the specimen 106 and ending at the detector element 108 (not shown in FIG. 2) of the laser scanning microscope 100. The second light path 202 comprises the objective lens 214, the second relay optic 212, the second scanning element 210, and the dichroic beam splitter 208.

Figure 3:
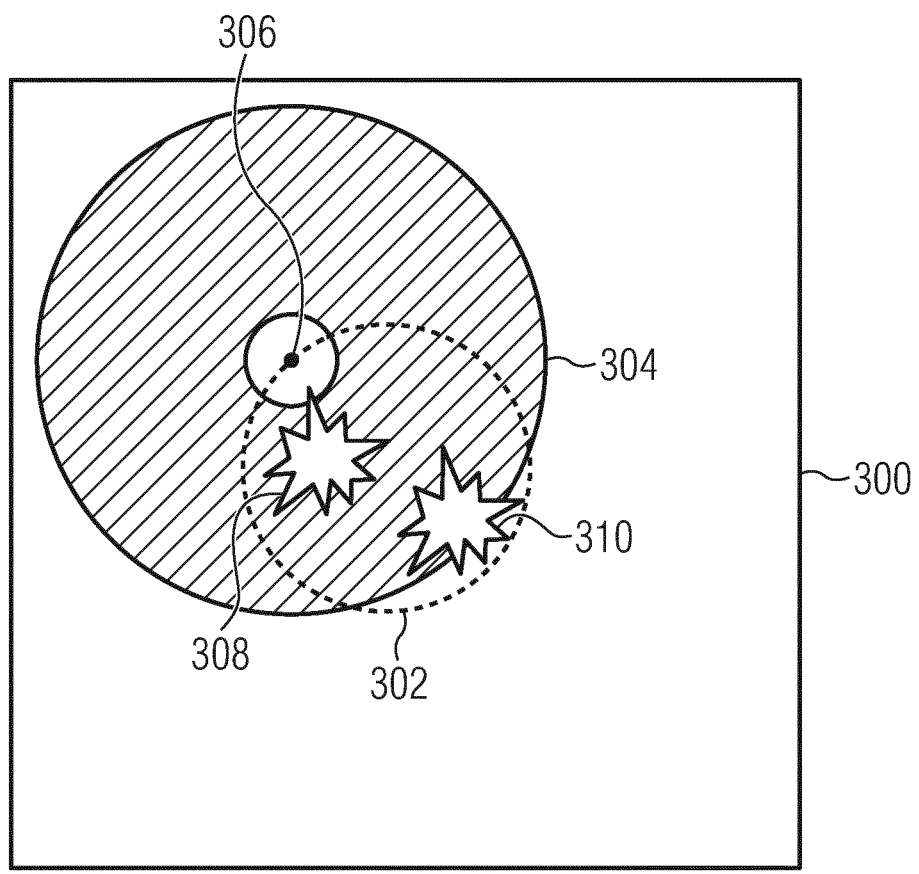
FIG. 3 is a schematic diagram of a target area of the laser scanning microscope.

The first scanning element 204 is configured to scan the target area 300 with the illumination light beam along a closed trajectory 302 (see FIG. 3). In the embodiment shown in FIG. 2, the first scanning element 204 is e.g. formed as a piezo driven mirror device. However, the first scanning element 204 may also be formed by a microelectromechanical device, an acousto-optic device, such as an acousto-optic deflector or an acousto-optic modulator, a movable lens or another piezo driven element such as a piezo rod or stack. Various embodiments of the first scanning element 204 are described below with reference to FIGS. 7 to 10.

The second scanning element 210 is configured to direct the illumination light beam onto the target area 300. While the first scanning element 204 provides means for fine adjustment of the position of the illumination light beam within the target area 300, the second scanning element 210 is used for course adjustment of the position of the illumination light beam and for selecting the target area 300 within the specimen 106. Both the first scanning element 204 and the second scanning element 210 are arranged in a pupil plane of the optical system 104 or a plane that is optically equivalent to a pupil plane of the optical system 104—in particular a pupil plane of the objective 214—and configured to move the illumination light beam in a first direction and in a second direction which is perpendicular to the first direction. The second scanning element 210 may be positioned such that the fluorescence light is descanned, i.e. always directed onto the same position on the detector element 108. In this case, the laser scanning microscope 100 may be a confocal microscope.

The dichroic beam splitter 208 is arranged between the first relay optic 206 and the second scanning element 210. The dichroic beam splitter 208 is configured to deflect the illumination light beam while allowing the fluorescence light to pass, thereby separating the first light path 200 and the second light path 202. The dichroic beam splitter 208 acts as a main beam splitter of the laser scanning microscope 100.

FIG. 3 shows a schematic diagram of the target area 300. The closed trajectory 302 is shown in FIG. 3 as a dotted line. In the present embodiment, the closed trajectory 302 is circular. The position of the illumination light beam is shown as a crosshatched area 304, where the crosshatched area 304 corresponds to an area of the transverse intensity profile of the illumination light beam in which the intensity of the illumination light beam is above 50% of its maximum intensity.

The illumination light beam moves within the target area 300 such that its center 306 moves along the closed trajectory 302. While moving within the target area 300, the illumination light beam excites two fluorophores 308, 310 that are positioned within the target area 300. The excited fluorophores 308, 310 each comprise different spectral characteristics and therefore emit fluorescence light at different wavelengths. The intensity of the fluorescence light emitted by each fluorophore 308, 310 is dependent on the intensity of the illumination light beam at the position of said fluorophore 308, 310. Since the intensity of the illumination light beam is non-uniform and the illumination light beam performs the periodic motion within the target area 300, the intensity at each point of the target area 300 will vary in a periodic manner. This means that the intensity of the fluorescence light will also vary periodically. The intensity distribution of the fluorescence light emitted by one of the fluorophores 308, 310 is thus determined by the position of said fluorophore. In turn, the position of said fluorophore can be determined from the intensity distribution of the fluorescence light. This will be explained further in the following with reference to FIG. 4.

Figure 4:
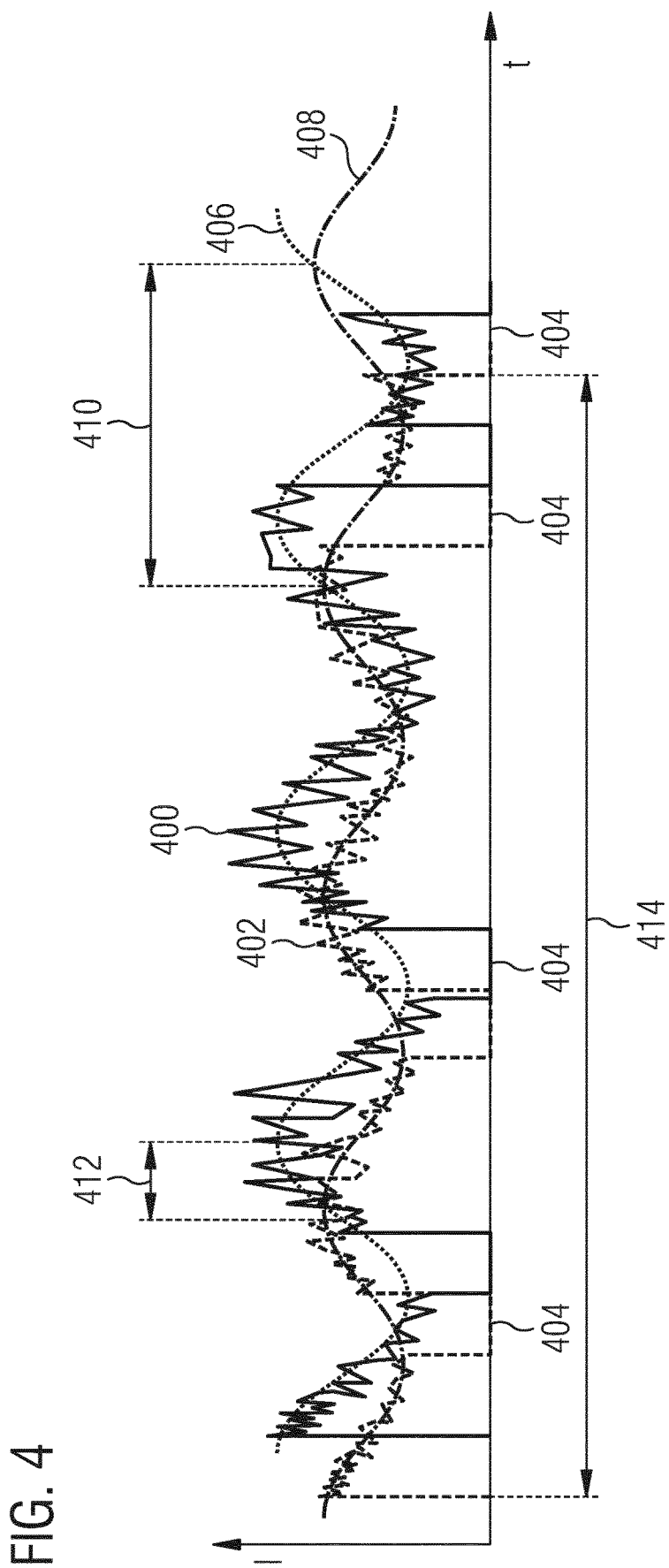
FIG. 4 is a diagram of intensity distributions of fluorescence light emitted by two fluorophores located within the target area.

FIG. 4 shows a schematic diagram of the detected intensity distributions of the fluorescence light emitted by two fluorophores which might be positioned relative to each other in a similar manner as this is shown e.g. by the two fluorophores 308, 310 located within the target area 300. The abscissa of the diagram denotes time t, and the ordinate denotes intensity I of the detected fluorescence light. A first graph 400 shows a first intensity distribution of the fluorescence light emitted by the first fluorophore 308, i.e. a time series of the fluorescence light detected by the detector element 108, as a solid line. A second graph 402 shows a second intensity distribution of the fluorescence light emitted by the second fluorophore 310 as a dashed line.

The first and second intensity distributions contain noise, in particular photon shot noise. The intensity distributions further contains segments 404 in which little to no fluorescence light is emitted by the fluorophores 308, 310. In order to determine the position of the first and second fluorophores 308, 310, a periodic function is fitted to each of the detected intensity distributions. A first periodic function 406, illustrated in FIG. 4 by a dotted line, is fitted to the first intensity distribution and a second periodic function 408, illustrated in FIG. 4 by a dash-dotted line, is fitted to the second intensity distribution. A method of fitting the first and second periodic functions 406, 408 and determining the position of the first and second fluorophores 308, 310 is detailed below with reference to FIG. 5.

As can be clearly seen in FIG. 4, both the first and the second periodic functions 406, 408 have the same period which is indicated by a first double arrow 410. The period of the first and the second periodic functions 406, 408 corresponds to the time required by the illumination light beam to run along the closed trajectory 302 once, i.e. one period of the periodic motion of the illumination light beam. This is due to the fact that the intensity of the fluorescence light emitted by the fluorophores 308, 310 depends in the intensity of the illumination light beam at the position of the respective fluorophore 308, 310. Since the transverse intensity profile of the illumination light beam is non-uniform, each point within the target area 300 is subjected to a periodically changing intensity. Thus, the intensity of the fluorescence light emitted by the fluorophores 308, 310 within the target area 300 changes periodically as well.

Further, the first and second periodic functions 406, 408 differ in phase and amplitude. The phase difference between the first periodic function and the second periodic functions 406, 408 is shown in FIG. 4 by a second double arrow 412. The differences in phase and amplitude are due to the fact that the first and second fluorophores 308, 310 are positioned at different positions within the target area 300. With respect to a polar coordinate system having an origin at the center 306 of the circular closed trajectory 302 shown in FIG. 3, the phase of a periodic function of a fluorophore corresponds to polar angle of the position of said fluorophore. The amplitude of the periodic function of the fluorophore can be related to the radial coordinate of the position of said fluorophore.

A third double arrow 414 shown in FIG. 4 denotes the average burst time of the first and second fluorophores 308, 310. The average burst time is roughly 3.5 times the period of the periodic motion of the illumination light beam. Thus, the illumination light beam runs the closed trajectory 302 about 3.5 times within the average burst time of the first and second fluorophores 308, 310.

Figure 5:
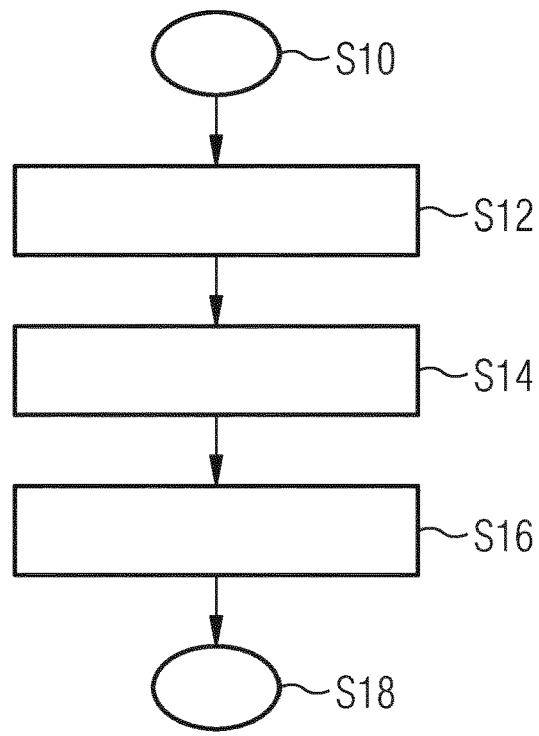
FIG. 5 is a flowchart of a process for determining the position of the fluorophores within the target area by means of the laser scanning microscope according to FIG. 1.

FIG. 5 is a flowchart of a process for determining the position of the fluorophores 308, 310 within the target area 300 (see FIG. 3) by means of the laser scanning microscope 100 according to FIG. 1.

The process starts in step S10. In step S12 the illumination light beam is directed onto the target area 300 by means of the second scanning element 210. Then, in step S14 the target area 300 is scanned with the illumination light beam along the closed trajectory 302 by means of the first scanning element 204. Thus, the fluorophores 308, 310 within the target area 300 are excited to emit the fluorescence light which is detected by the detector element 108. A time series of the detected fluorescence light is saved by the processor 110 as the intensity distribution of the fluorescence light.

In the following step S16, the processor 110 fits a periodic function to the intensity distribution. The general shape of the periodic function can be obtained by simulation. It is particularly advantageous to determine, e.g. by numerical or analytical computation, the expected intensity distribution for a number of different positions of the fluorophore within the target area 300. The fit may then be performed by determining a figure of merit determining the agreement between the computed intensity distribution and the measured intensity distribution. If the figure of merit is within a predetermined range showing sufficient agreement, the position of the fluorophore associated with the computed intensity distribution is saved.

Likewise, the positions of two or more fluorophores 308, 310 within the target area 300 can be determined. If the fluorophores 308, 310 emit fluorescence light at different wavelengths or wavelength ranges, each intensity distribution may be fitted as described above. The fluorescence light at different wavelengths or wavelength ranges might be detected with different detectors of the detector element 108 (not shown in the Figures) after a suitable spectral separation of the fluorescence light at different wavelengths or wavelength ranges. If the fluorophores 308, 310 emit fluorescence light at the same wavelengths or in the same wavelength ranges, the measured intensity distribution is compared to computed intensity distributions of two or more fluorophores 308, 310 with different positions within the target area 300. Alternatively, intensity distributions of the two or more fluorophores 308, 310 may be separated by statistical means, e.g. by analyzing changes and/or occurrences of beating frequencies within the measured intensity distribution, or by determining an amplitude spectrum, a phase spectrum and/or a frequency spectrum of the measured intensity distribution, e.g. by means of a Fourier transformation. After the intensity distributions of the two or more fluorophores 308, 310 have been separated, each intensity distribution may be fitted a described above.

The process is then stopped in step S18.

The process described in reference to FIG. 5 may be performed multiple times for different target areas of the specimen 106 in order to obtain an image of the specimen 106. This will be described in more detail in the following with reference to FIG. 6.

Figure 6:
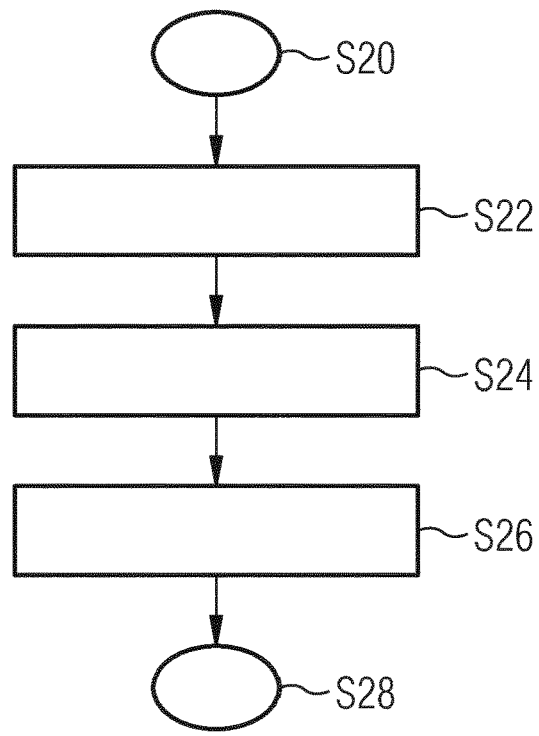
FIG. 6 is a flowchart of a process for obtaining the image of a specimen by means of the laser scanning microscope according to FIG. 1.

FIG. 6 is a flowchart of a process for obtaining the image of the specimen 106 by means of the laser scanning microscope 100 according to FIG. 1. The process starts in step S20. In the following step S22 the specimen 106 is scanned with illumination light beam by means of the second scanning element 210 along a predetermined grid. Step S22 serves to identify regions of interest within the grid, i.e. target areas of the specimen 106, wherein fluorophores 308, 310 are located. If fluorophores 308, 310 are present within a target area 300, they are excited by the illumination light beam to emit fluorescence light. For each target area 300, for which fluorescence light is detected when said target area 300 is scanned by the illumination light beam, i.e. in which fluorophores 308, 310 are located, the position of said target area 300 within the grid is saved.

Then, in step S24 each target area 300 is scanned with illumination light beam by means of the first scanning element 204 along the closed trajectory 302 in order to identify the position of the fluorophore within the target area 300. The positions of the fluorophores 308, 310 within each target area 300 are saved. In step S26, the image is constructed from the saved positions of the fluorophores 308, 310. The process is then stopped in step S28.

In an alternative embodiment, the target area 300 is moved across the grid by means of the second scanning element 210 while the target area 300 is scanned with the illumination light beam by means of the first scanning element 204. This alternative embodiment allows for fast super resolution imaging of the specimen 106.

Figure 7A:
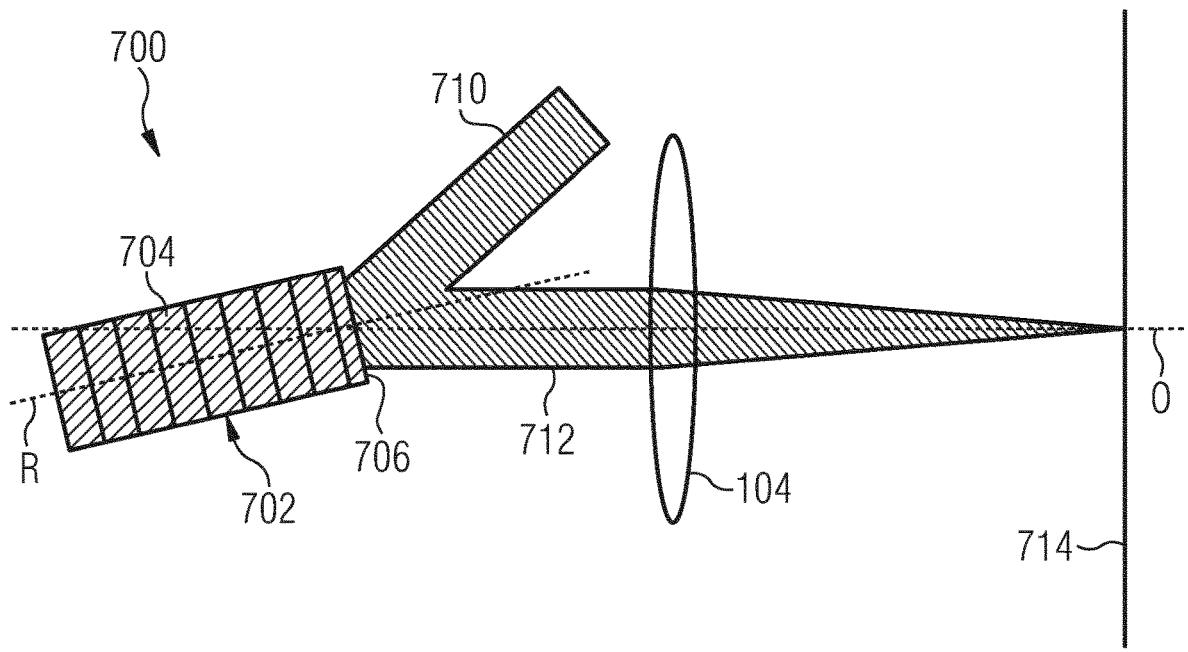
FIG. 7*a* is a schematic diagram of a first scanning element according to an embodiment.

FIG. 7a shows a schematic diagram of a first scanning element 700 according to an embodiment in a first position. The first scanning element 700 according to the present embodiment comprises a piezo tube device 702.

Figure 7B:
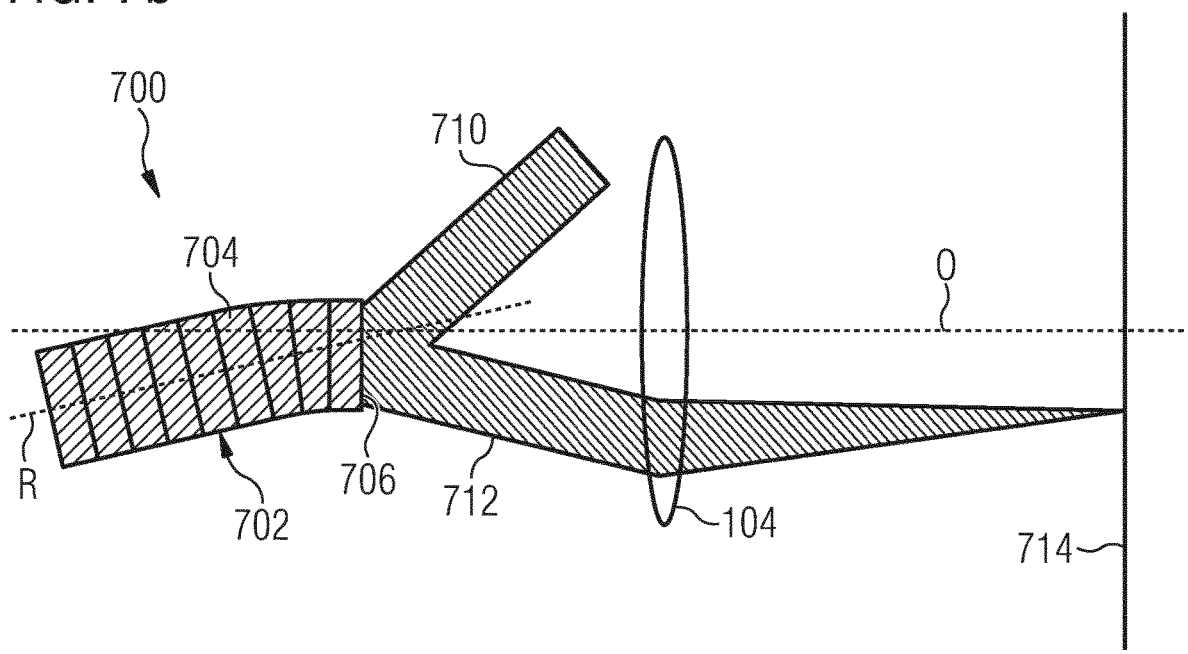
FIG. 7*b* is a schematic diagram of the first scanning element according to FIG. 7*a* an end thereof being deflected.

The piezo tube device 702 comprises a stack 704 of shearing piezo elements. The shearing piezo elements are configured such that applying an appropriate voltage to individual piezo elements the stack 704 causes a circular movement of an end 706 of the stack 704 around a rotation axis R. The circular movement of the end 706 is illustrated by FIG. 7b showing the first scanning element 700 according to FIG. 7a the end thereof being deflected away from the rotational axis R.

The end 706 comprises a reflective surface and may comprise the phase mask 114. An incoming illumination light beam 710 is directed to the reflective surface of the end 706 and reflected thereby according a deflection angle of the bent stack 704 as an outgoing illumination light beam 712. The outgoing illumination light beam 712 enters the optical system 104 which is illustrated in FIGS. 7a and 7b as a single lens. The circular movement of the end 706 of the stack 704 around the rotation axis R is translated into a circular movement of the outgoing illumination light beam 712 around the optical axis O. Thus, the illumination light beam 712 is moved in the circular closed trajectory 302 in the focal plane 714 of the optical system 104.

Figure 8A:
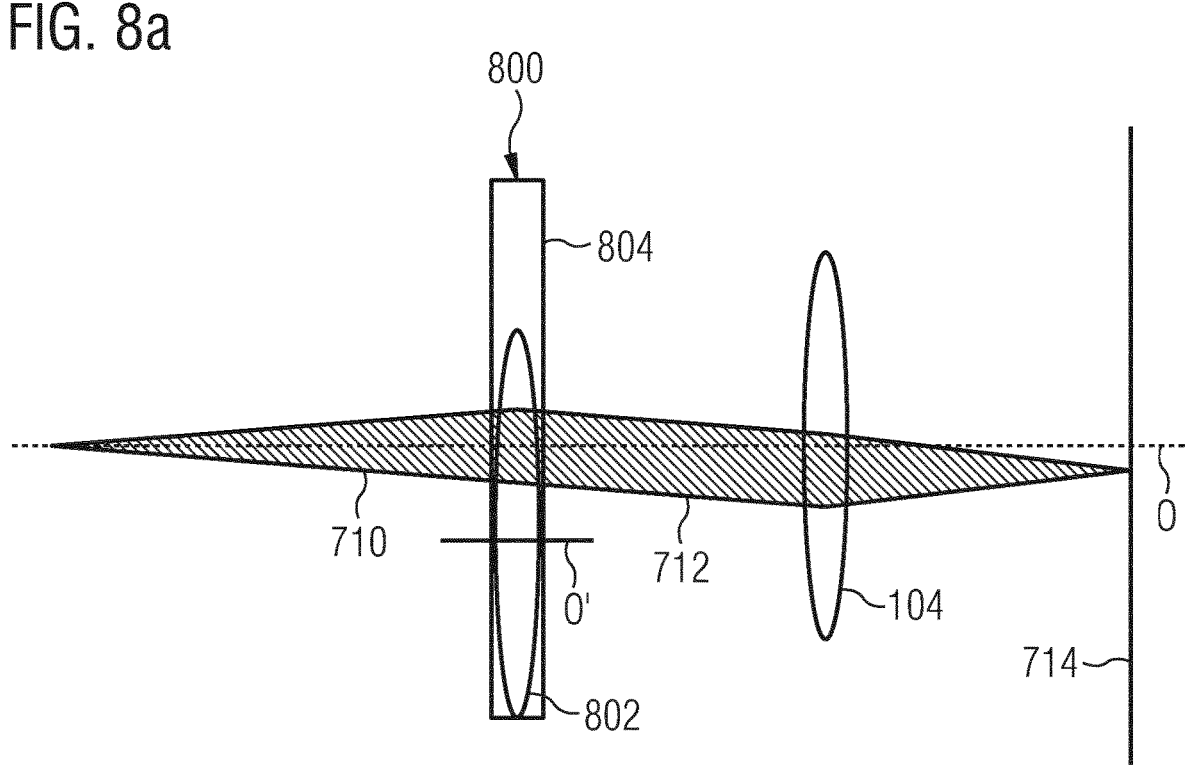
FIG. 8*a* is a schematic diagram of a first scanning element according to another embodiment.

FIG. 8a shows a schematic diagram of a first scanning element 800 according to another embodiment. The first scanning element 800 according to the present embodiment comprises a movable lens 802.

Figure 8B:
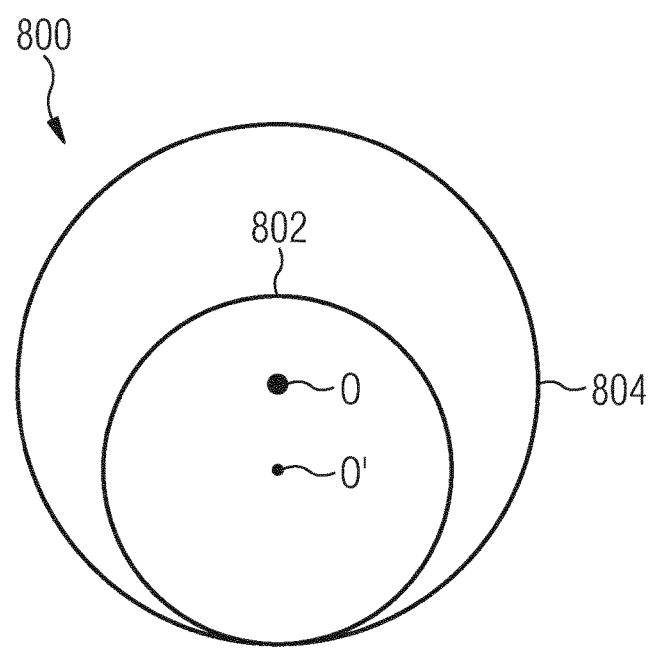

The movable lens 802 is mounted on a rotating element 804 and located off-center with regard to its rotation axis that coincides with the optical axis O of the optical system 104. The position of the movable lens 802 with respect to the optical axis O of the optical system 104 is illustrated in FIG. 8b showing a top view of the first scanning element 800.

The incoming illumination light beam 710 is directed along the optical axis O of the optical system 104 to the movable lens 802. Since the optical axis O' of the movable lens 802 and the optical axis O of the optical system 104 are parallelly displaced to each other, the incoming illumination light beam 710 passes the movable lens 802 off-center with respect to the optical axis O' thereof. Consequently, the outgoing illumination light beam 712 is refracted towards the optical axis O' of the movable lens 802, i.e. away from the optical axis O of the optical system 104. The circular movement of the movable lens 802 around the optical axis O of the optical system 104 is thereby translated into a circular movement of the outgoing illumination light beam 712 around the optical axis O. Thus, the illumination light beam 712 is moved in the circular closed trajectory 302 in the focal plane 714 of the optical system 104.

Figure 9A:
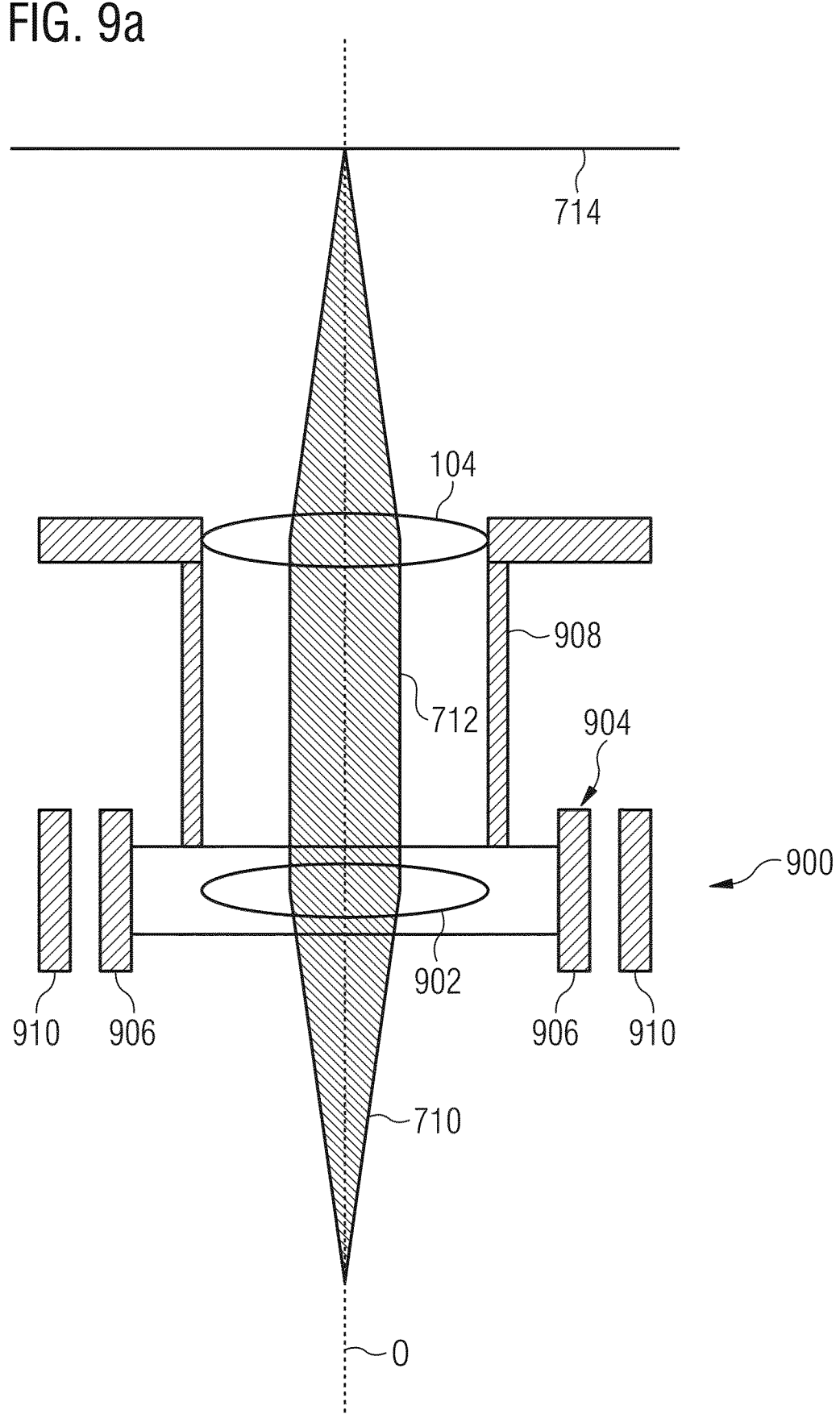
FIG. 9*a* is a schematic diagram of a first scanning element according to another embodiment in a first position.

FIG. 9a shows a schematic diagram of a first scanning element 900 according to another embodiment in a first position. The first scanning element 900 according to the present embodiment comprises a movable lens 902 and is distinguished from the first scanning element 800 according FIGS. 8a and 8b in that the movable lens 902 is actuated by a magnetic field to perform the circular movement.

Figure 9B:
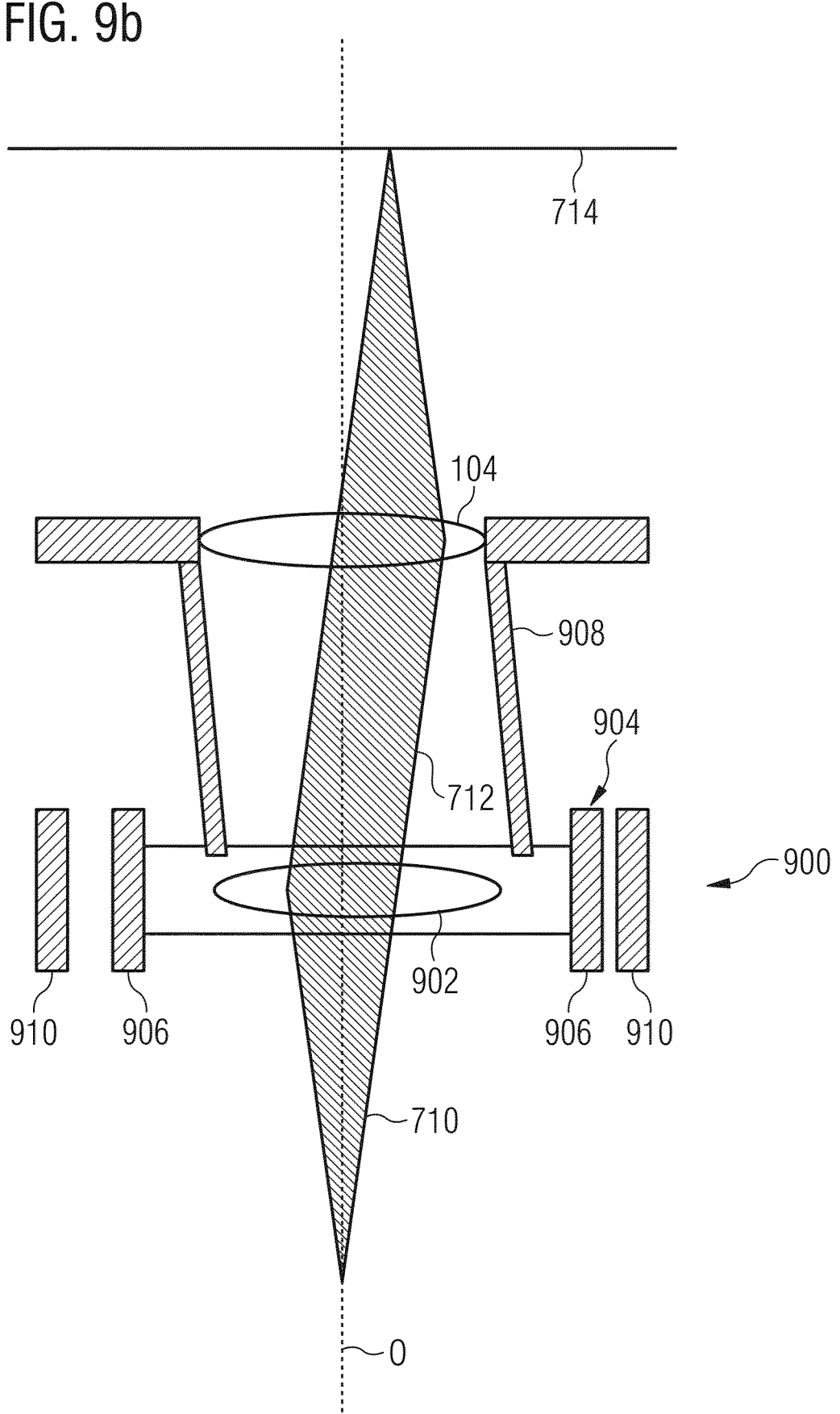
FIG. 9*b* is a schematic diagram of the first scanning element according to FIG. 9*a* in a second position.

In the present embodiment, the movable lens 902 is mounted in a lens mount 904 which is equipped with coils 906 in order to produce a magnetic field. The lens mount 904 is attached by a flexible mounting 908 to the optical system 104, allowing a movement in the plane perpendicular to the optical axis O of the optical system 104. Fixed coils 910 are arranged opposite to the coils 906 of the lens mount 904. By applying currents through the coils 906 of the lens mount 904 and/or the fixed coils 910, a force generated by the magnetic field will move the lens mount 904 in a direction perpendicular to the optical axis O. By applying time-dependent, synchronized currents, the lens mount 904 holding the movable lens 902 will perform a circular movement. This circular movement is illustrated by FIG. 9b which shows the first scanning element 900 according to FIG. 9a in a second position. The incoming illumination light beam 710 entering the movable lens 902 will be deflected by the off-centered movable lens 904 as described above with reference to FIGS. 8a and 8b.

Figure 9C:
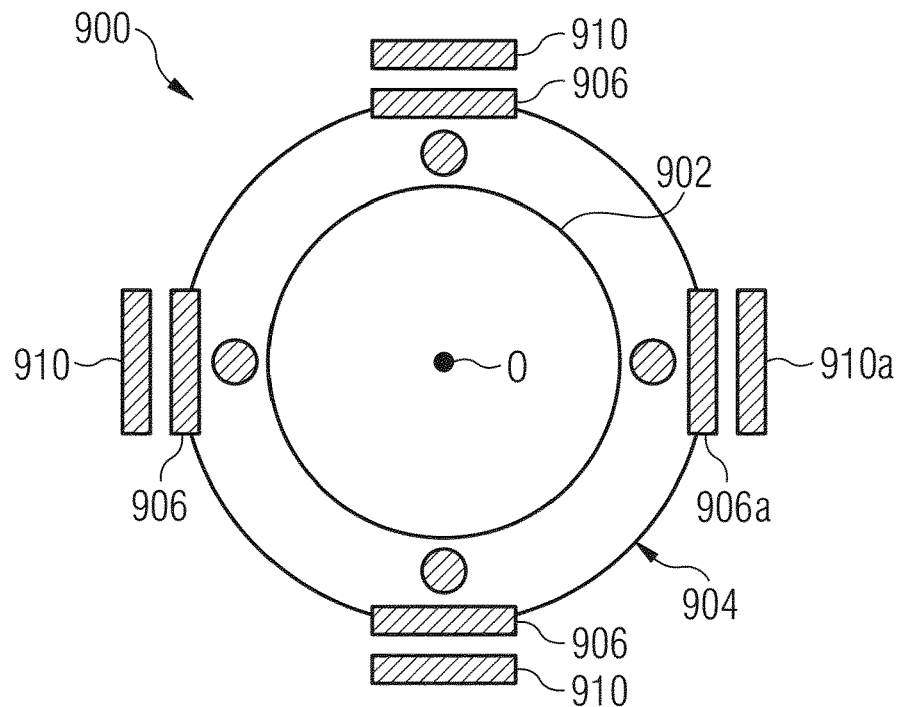
FIG. 9*c* is a top view of the first scanning element according to FIG. 9*a* in the first position.
Figure 9D:
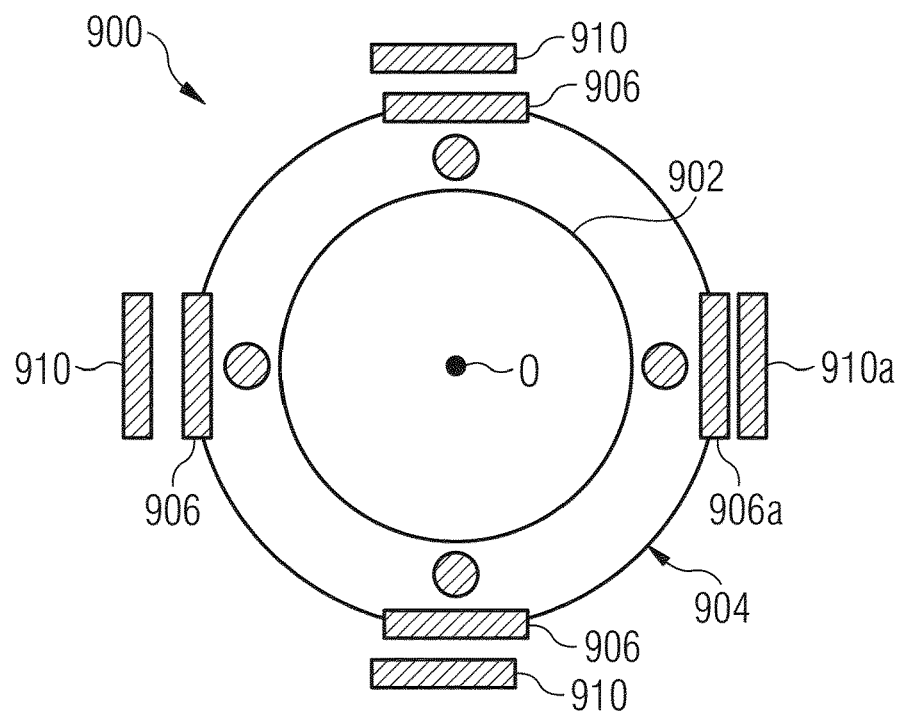
FIG. 9*d* is a top view of the first scanning element according to FIG. 9*a* in the second position.

FIGS. 9c and 9d each show a top view of the first scanning element 900. FIG. 9c shows the first scanning element 900 in the first position when no voltage is applied to the coils 908 of the lens mount 904 or the fixed coils 910. FIG. 9d shows the first scanning element 900 in the second position when a voltage is applied to the rightmost coil 906a of the lens mount 904. The force generated by the magnetic field of the rightmost coil 906a moves the lens mount 904 towards the fixed coil 910a located directly opposite the rightmost coil 906a, i.e. to the right in FIG. 9d.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A laser scanning microscope, comprising:
    a light source configured to form an illumination light beam, the illumination light beam having a transverse light intensity profile comprising an intensity minimum located at a center of the illumination light beam,
    a scanning device configured to scan the illumination light beam so that the center of the illumination light beam moves along a closed trajectory in a target area of a specimen,
    a detector configured to detect fluorescence light emitted by a fluorophore within the target area of the specimen, the fluorophore being excited by the illumination light beam, and
    a processor configured to;
        determine an intensity distribution of the fluorescence light as a function of time,
        fit a periodic function to the intensity distribution of the fluorescence light, and
        determine a position of the fluorophore within the target area based on at least one parameter of the fitted periodic function.

2. The laser scanning microscope according to claim 1, wherein the processor is configured to determine an amplitude spectrum, a phase spectrum and/or a frequency spectrum from the intensity distribution of the fluorescence light, to determine a number of fluorophores within the target area from the amplitude spectrum, the phase spectrum and/or the frequency spectrum, and to determine the position of each of the number of fluorophores based on the amplitude spectrum, the phase spectrum and/or the frequency spectrum.

3. The laser scanning microscope according to claim 1, wherein the scanning device is configured such that a time interval required for the illumination light beam to run along the closed trajectory once is shorter than an average burst time of the fluorophore.

4. The laser scanning microscope according to claim 1, wherein the closed trajectory comprises an elliptical, a circular or a spiral trajectory.

5. The laser scanning microscope according to claim 4, wherein a dimension of the closed trajectory is smaller than or equal to a beam diameter of the illumination light beam.

6. The laser scanning microscope according to claim 1, wherein the closed trajectory is scanned relative to a predetermined position of the target area and/or wherein a periodic recurring position of the closed trajectory is at a position of the target area or deviates from the position of the target area maximal by a beam diameter of the illumination light beam.

7. The laser scanning microscope according to claim 1, wherein the light source comprises a phase mask for creating an optical vortex along a propagation direction of the illumination light beam.

8. The laser scanning microscope according to claim 1, further comprising a beam splitter configured to separate the illumination light beam and the fluorescence light emitted by the fluorophore.

9. The laser scanning microscope according to claim 1, further comprising a second scanning device for directing the illumination light beam onto the target area.

10. The laser scanning microscope according to claim 9, wherein at least one of the second scanning device and the scanning device is operated either time sequentially or at the same time.

11. The laser scanning microscope according to claim 1, wherein the scanning device comprises at least one of: a wobbling device, a MEMS device, an acousto-optic deflector (AOD), an acousto-optic modulator (AOM), a movable lens, or a piezo tube device.

12. The laser scanning microscope according to claim 1, wherein the scanning device is arranged in a pupil plane of the laser scanning microscope or in a plane that is optically equivalent to the pupil plane of the laser scanning microscope.

13. The laser scanning microscope according to claim 1, wherein the microscope is a confocal microscope.

14. The laser scanning microscope according to claim 1, wherein the scanning device comprises a resonant MEMS mirror or a piezo driven MEMS.

15. A method for determining a position of a fluorophore within a target area of a specimen, the method comprising:
    forming an illumination light beam, the illumination light beam having a transverse light intensity profile comprising an intensity minimum located at a center of the illumination light beam,
    scanning the illumination light beam so that the center of the illumination light beam moves along a closed trajectory in the target area of the specimen,
    exciting a fluorophore within the target area with the illumination light beam,
    detecting fluorescence light emitted by the fluorophore,
    determining an intensity distribution of the fluorescence light as a function of time,
    fitting a periodic function to the intensity distribution of the fluorescence light, and
    determining a position of the fluorophore within the target area based on at least one parameter of the fitted periodic function.

* * * * *